Oct. 31, 1967
E. R. ERB ETAL
3,350,483
FLOOR COVERING METHOD
Filed April 3, 1964
2 Sheets-Sheet 1
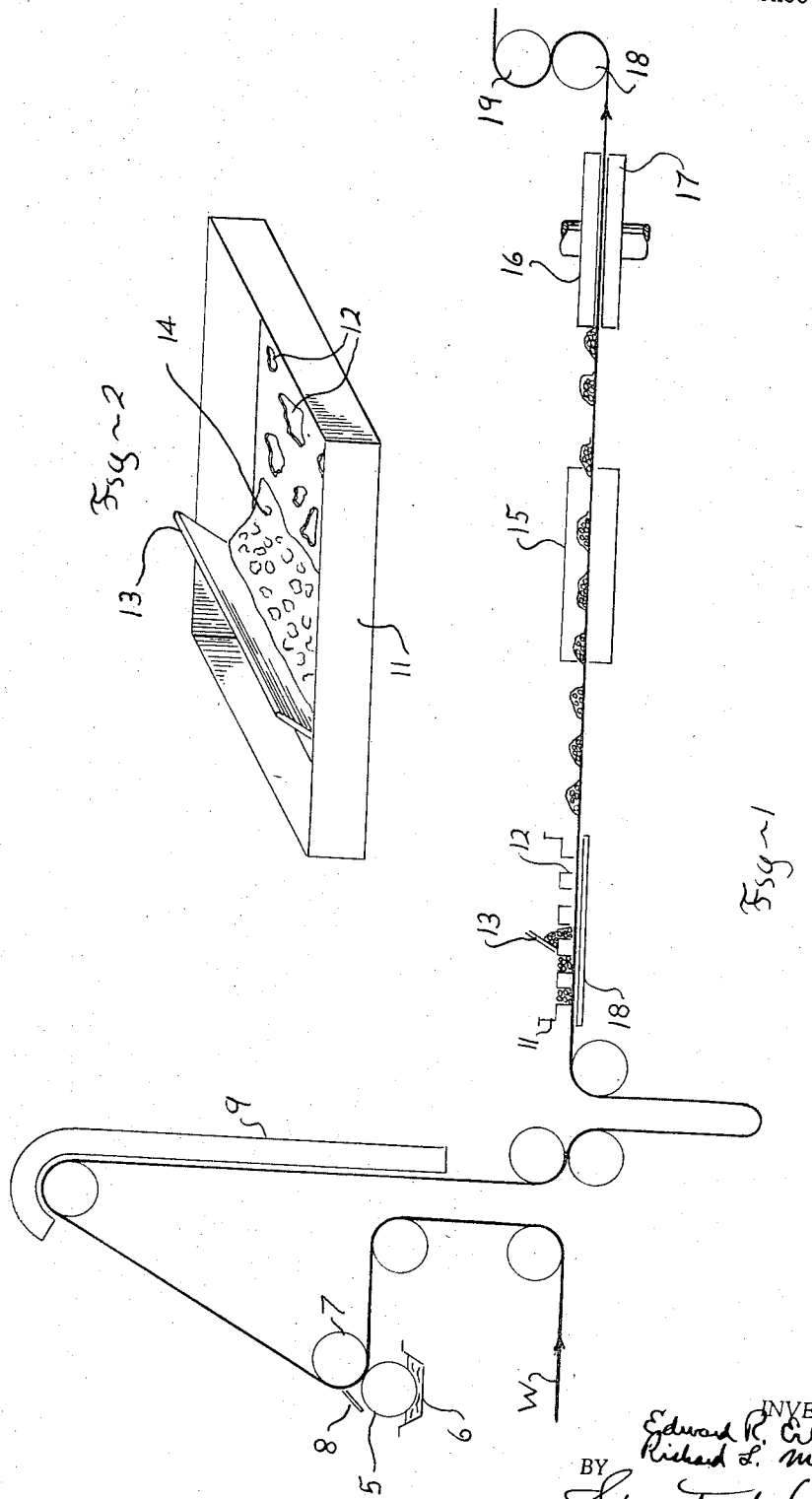
INVENTORS
Edward R. Erb
Richard L. Masso
BY
Synnestvedt & Lechner
ATTORNEYS

United States Patent Office 3,350,483
Patented Oct. 31, 1967

3,350,483
FLOOR COVERING METHOD
Edward R. Erb, Geryville, and Richard L. Maass, Salisbury Township, Lehigh County, Pa., assignors, by mesne assignments, to The Ruberoid Co., South Bound Brook, N.J., a corporation of New Jersey
Filed Apr. 3, 1964, Ser. No. 357,183
2 Claims. (Cl. 264—74)

This invention relates to covering materials, especially hard surface covering materials such as are suitable for floor coverings. The invention is particularly concerned with floor coverings of novel construction making possible unique types of decorative effects. The invention is also concerned with a novel technique for producing the floor coverings of the invention.

More specifically, the invention contemplates floor coverings of the vinyl resin type having a construction providing a decorative or pattern effect characterized by elongated and swirling pattern areas radiating in various directions from focal points or focal zones.

In addition, in most instances, the floor coverings of the invention are further characterized by a pattern effect "in depth," i.e., a construction providing a decorative effect in which portions of the decoration are visible below the surface of the floor covering through a transparent resin material. Although the effect here referred to is difficult of precise description, it is a striking effect, giving the impression or "feel" that the observer is seeing into the floor covering for a substantial distance, even though the thickness of the actual decorative layer incorporated in the floor covering may not be greater than about $\frac{1}{64}$ of an inch.

According to the invention, various patterns may be incorporated in the decorative effect, either of random type or according to a predetermined location or repetition of figures or designs.

Before considering the make-up or construction of the products in detail, and also before fully analyzing the technique for producing the products, there is here given a brief generalized description of a typical product and a typical procedure according to the invention.

A substrate or base, for instance an asbestos felt web, is prepared, the preparation including application of a pigmented background coating or layer over the entire surface of the web. Splotches or gobs of a dispersion are then applied to or scattered over the background coating, the dispersion comprising a transparent liquid heat hardenable polyvinyl chloride resin dispersion medium in which are dispersed a multiplicity of randomly distributed polyvinyl chloride resin particles, preferably of a plurality of contrasting colors. The web is passed through an oven to at least gel or partly fuse the liquid dispersion medium and is then fed between the platens of a reciprocating press, and the press is actuated to flatten the splotches of dispersion. The volume of resin material applied in the splotches and the pressure applied are sufficient to cause the splotches to flow together and form a continuous layer of resin material over the surface of the web.

In consequence of the procedure just described, the dispersed particles applied in the transparent dispersion medium are flattened and caused to flow in various directions radiating from focal points located in the interior or central regions of the splotches initially applied. Because of this action many of the individual dispersed particles take on an elongated shape and their major axes are disposed in such arrangement as to radiate from the focal points. This, coupled with the fact that the dispersion medium is transparent so that the dispersed particles can be seen in depth, yields a striking type of pattern effect as will still further appear herebelow.

How the foregoing is accomplished is set out in greater detail in connection with the description of the accompanying drawings in which:

FIGURE 1 is a schematic or diagrammatic view of the method and equipment employed in accordance with the invention in producing the novel products;

FIGURE 2 is an enlarged isometric view of a portion of the equipment shown in FIGURE 1;

Figure 4:
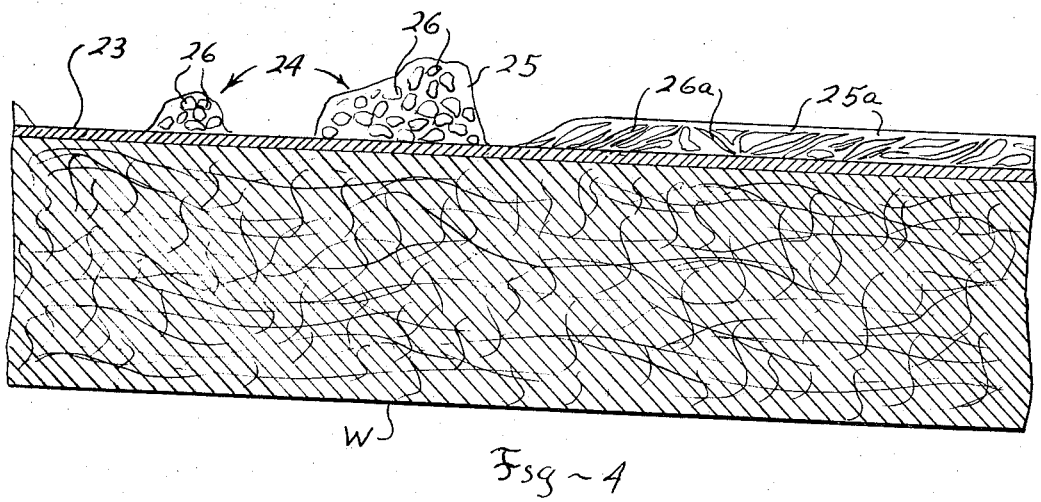
Figure 3:
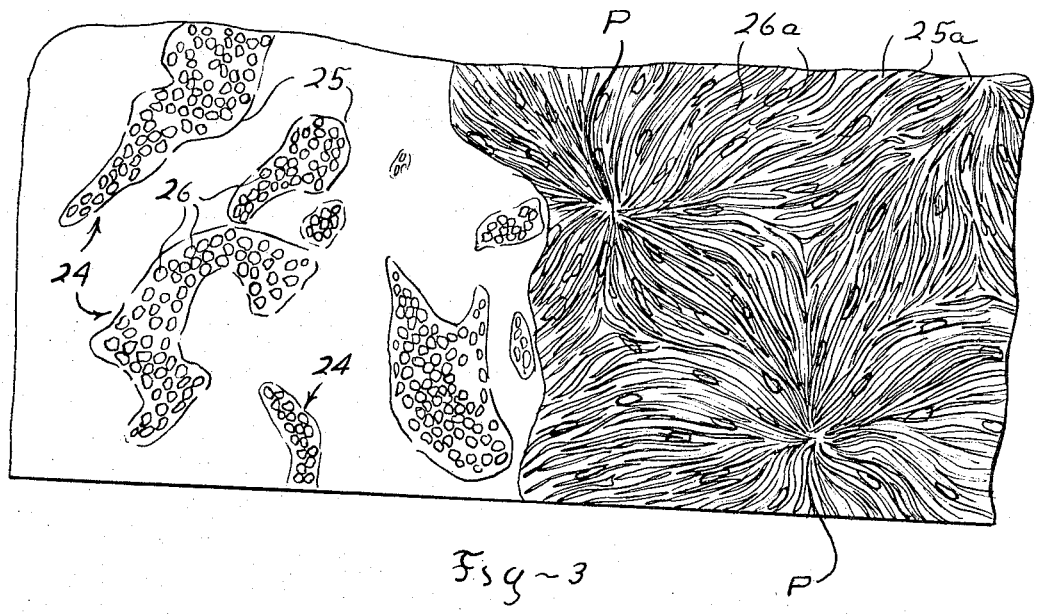

FIGURE 3 is a plan view of a portion of the product being prepared, the left hand part illustrating the splotches of dispersion applied to the substrate and the right hand part illustrating in a generalized manner the plan appearance of some of the particles after the pressing operation, although it will be understood that the "depth" effect referred to above is not and cannot be illustrated in a view such as this figure; and FIGURE 4 is an enlarged sectional view illustrating in a generalized manner the appearance of the product being made, both just before and after the pressing operation, the left portion showing the splotches of dispersion and the right portion showing pressed material, as in FIGURE 3.

In describing the method and equipment employed, reference is made to FIGURES 1 and 2.

In FIGURE 1 a web W, for instance an asbestos felt web, is fed to a coating mechanism including a roll 5 running in a reservoir 6 and adapted to transfer coating material from the reservoir to the web in the region of the back-up roll 7. A doctor blade 8 may be employed to assist in smoothing the coating material applied. As above indicated, the coating material here applied preferably includes a pigment, so as to provide a pigmented background coating on the web. The web then passes adjacent to a heater 9 which serves to dry the background coating. The web after passing through an accumulator loop is then led to a mechanism for applying the splotches of dispersion to the coated side of the web. For this purpose a stencil type of applicator may be utilized including a web supporting table 10 and a stencil 11 which (see also FIGURE 2) is in the form of a tray having apertured pockets in the lower wall thereof, as shown at 12, the pockets being adapted to receive individual charges or gobs of dispersion under the influence of the shiftable blade 13 which is adapted to move across the tray pushing ahead of it a mass 14 of the dispersion. The blade 13 is of course reciprocated from side to side of the tray and from time to time additional dispersion is introduced. Moreover it is contemplated that the tray be intermittently raised and lowered and that the web is advanced intermittently, thereby providing for depositing of the splotches of dispersion in scattered arrangement over all of the web surface as it progresses through the system. It will be understood that the splotch applicator equipment is here illustrated only in a generalized or diagrammatic manner and that any suitable equipment may be employed for delivering splotches of the dispersion to the web. The size of the splotches or gobs of the dispersion as shown in FIGURE 1 is greatly exaggerated, merely for the sake of illustration in the figure.

After leaving the splotch applicator mechanism the web proceeds through an oven 15 in which the liquid dispersion medium is at least gelled or partially fused and hardened. From the oven 15 the web passes in stepwise fashion between the press platens 16–17, being advanced by the pull rolls 18 and 19, and by means of the press the splotches of dispersion applied are flattened. At least the upper press platen 16 is heated, for instance to a temperature of about 350° F. so as to soften the resin and thus facilitate the flattening. This heating may also be relied upon for developing the full physical properties of the resin.

From the above it will be seen that in general the peration according to the invention includes first applying a pigmented background coating to the felt web indicated at W, the background coating itself appearing in FIGURE 4 at 23.

After the background coating is applied, the operation then contemplates application of splotches of the dispersion, such splotches being indicated in general in both FIGURES 3 and 4 by the numeral 24. As shown in both of FIGURES 3 and 4, the splotches comprise a dispersion consisting of a dispersion medium 25 and pigmented dispersed particles 26, both the dispersion medium and most of the particles being flattened or elongated by the pressing operation as indicated at 25a and 26a in FIGURES 3 and 4.

FIGURES 3 and 4 plainly show the flattening of the splotches to such an extent as to cause them to flow together and thus provide a continuous coating over the surface of the web. In FIGURE 4 the location of various of the particles 26a below the surface of the transparent dispersion medium 25a may be observed, although it will be understood in connection with FIGURE 4 that the size and proportions of layers and particles are not to be taken as numerically accurate or precise, but are only presented in an effort to graphically illustrate what is involved.

FIGURE 3 still further plainly shows the effect of the elongated particles radiating in various directions from focal points indicated at P. These focal points occur in regions generally centrally of splotches or gobs of dispersion applied. The illustration in FIGURE 3 is approximately on the scale of an actual product, but it is to be understood that the illustration is of a generalized character and not intended to precisely depict the product. However, taken with the description, the illustration will assist in an understanding of the nature of the product of the invention.

It is to be kept in mind that the splotches of the dispersion applied to the web may be scattered at random over the web, for instance in the manner more or less diagrammatically indicated in FIGURE 1. On the other hand if it is desired the splotches may be applied according to a predetermined figure or design which may be repeated at regular intervals throughout the length of the web. In either event it is preferred to apply sufficient resin material in the splotches to provide for flowing together of the splotches over the surface of the web and thereby provide a continuous layer or coating over the web.

As above indicated, both the dispersion medium and also the dispersed particles advantageously comprise polyvinyl resin material and this is preferably also true of the background coating 23. With respect to the composition of the various materials applied the following are given by way of example, and it is to be understood that variations may be introduced without departing from the spirit of the present invention, the invention being more concerned with what might be termed the construction or make-up of the product and the method, rather than with the specific compositions employed.

For the background coating a composition incorporating a pigment is preferred, for instance a formulation as follows:

| | Parts |
|---|---|
| Polyvinyl chloride dispersion type resin | 100 |
| Butyl benzyl phthalate plasticizer | 50 |
| Epoxidized soya oil | 6 |
| Barium-cadmium-zinc stabilizer | 4½ |
| Titanium dioxide | 30 |
| Mineral spirits | 6 |

A typical composition for the transparent liquid heat hardenable dispersion medium employed may be according to the above formulation, except for the omission of the titanium dioxide.

Although the dispersed particles may comprise chips or particles made from gelled or fused polyvinyl chloride resin material, most advantageously the particles comprise gelled but incompletely fused beads of polyvinyl chloride resin material prepared in accordance with the disclosure of the Miller application Ser. No. 306,953, filed Sept. 5, 1963, assigned to the assignee of the present application. Gelled particles of this type are rounded or generally spherical, and particles of this rounded shape contribute a pleasing effect when elongated by the pressing. Regardless of how the particles are made, they are preferably of size easily visible when the floor covering is in use, for instance, the particles should be from about 1/64 inch to about 1/8 inch in size or diameter.

The particles are desirably pigmented and for many pattern effects it is contemplated to employ randomly intermixed or interspersed particles of various different colors. In addition to pigmenting, the particles may contain metal foil chips, or chips of pearlescent or other decorative materials and indeed such metal chips or other decorative particles may also be distributed in the transparent dispersion medium in combination with the pigmented gelled beads. In these ways very pleasing combination pattern effects may be achieved, in all of which several characteristic effects of the present invention are still present, namely the visibility or appearance in depth of elongated particles having their major axes radiating or swirling in various directions from focal points or focal zones localized within the areas in which the splotches were initially applied.

Other products according to the invention may be produced by employing a dispersion medium which is tinted or translucent, or even opaque, in which latter event (if the dispersed particles are also pigmented) the "depth" effect above described is not present, although the characteristic effect of the elongated pattern areas swirling from focal points is still present.

Still further, the dispersion medium may be pigmented and the dispersed particles transparent, and in this variation the "depth" effect and also the swirling effect are nevertheless both present.

As one typical example of a specific decorative effect, mention is made of the use of dispersed particles all of which carry a white pigment applied to a background coating of a darker color, for instance a gray, together with gold colored metal foil chips dispersed at random throughout the transparent dispersion medium in which the white particles or beads are applied to the product. In this way a very pleasing pattern is secured in which the background coating shows through in localized areas between the flattened and elongated white beads and gold flecks.

In connection with the type of pattern effect obtained with products made up according to the invention it is noted that pressing of the splotches of dispersion produces a random effect in the radiation of swirling of the particles or pattern areas from the focal points whether or not the splotches themselves are applied at random or in accordance with a predetermined design.

Other pleasing effects may be obtained by utilizing contrast between the color of the dispersed particles and the color of the background coating. For example, the background coating may carry a white pigment and the dispersed particles may be of several different colors, contrasting with the white background coating.

In producing the pattern effects of this invention it is imporant that the dispersion be at least gelled before pressing. As indicaed in the typical example described above the web is heated in an oven to at least partially fuse the splotches of the dispersion before pressing. If desired this heating may be only sufficient to gel the dispersion, in which event the completion of the fusion may be effected either during or after pressing or partly during and partly after pressing.

Regardless of when the heating to fuse or harden the resin materials is effected, the temperature of the resin materials is advantageously brought up to a temperature of from about 325° F. to about 375° F. for a period of from about 15 seconds to one minute, in order to fully develop the properties of the resin materials and also to ensure complete interfusion of the several different resin materials applied.

In a typical product according to the present invention, the background coating may be of a thickness of 2 mils to 15 mils. Moreover in a typical product the splotches of resin material applied should be sufficient to provide a continuous layer or coating over the product of from 10 mils to 40 mils in thickness.

We claim:

1. A method for applying surface covering decoration to a substrate web comprising applying to the web splotches of a dispersion comprising a transparent liquid heat hardenable polyvinyl chloride resin dispersion medium incorporating dispersed particles of pigmented polyvinyl chloride resin material, the splotches being applied in spaced relation, heating to at least gel the dispersion medium, flattening the dispersion splotches on the substrate web by intermittently and sequentially applying pressure to successive areas of the web, and applying heat to the dispersion splotches while pressure is applied the quantity of the dispersion in the splotches and the pressure and heat applied being sufficient to effect flowing of the spaced splotches together, thereby forming a continuous layer covering the substrate web.

2. A method in accordance with claim 1 in which the pigmented particles dispersed in the dispersion medium comprise gelled but incompletely fused polyvinyl chloride resin material.

References Cited

UNITED STATES PATENTS

| | | |
|---|---|---|
| 2,987,102 | 6/1961 | Heinricks. |
| 3,049,761 | 8/1962 | Yakubik. |
| 3,170,808 | 2/1965 | Almy et al. _____ 117—20 |
| 3,198,682 | 8/1965 | Hassel et al. _____ 117—21 X |
| 3,202,738 | 8/1965 | Reichert _____ 264—77 |
| 3,219,735 | 11/1965 | Iverson et al. _____ 264—74 X |

JACOB H. STEINBERG, *Primary Examiner.*

ALEXANDER WYMAN, *Examiner.*

W. POWELL, *Assistant Examiner.*

UNITED STATES PATENT OFFICE

CERTIFICATE OF CORRECTION

Patent No. 3,350,483                      October 31, 1967

Edward R. Erb et al.

It is hereby certified that error appears in the above numbered patent requiring correction and that the said Letters Patent should read as corrected below.

In the heading to the printed specification, lines 5 and 6, for "The Ruberoid Co., South Bound Brook, N. J., a corporation of New Jersey" read -- General Aniline & Film Corporation, a corporation of Delaware --.

Signed and sealed this 25th day of February 1969.

(SEAL)
Attest:

Edward M. Fletcher, Jr.
Attesting Officer

EDWARD J. BRENNER
Commissioner of Patents